US008035091B2

(12) United States Patent
Daly et al.

(10) Patent No.: US 8,035,091 B2
(45) Date of Patent: Oct. 11, 2011

(54) PASSIVE OUTDOOR MILLIMETER WAVE ILLUMINATOR

(75) Inventors: Robert Patrick Daly, Orlando, FL (US); Willem H. Reinpoldt, III, Windermere, FL (US)

(73) Assignee: Microsemi Corporation, Aliso Viejo, CA (US)

( * ) Notice: Subject to any disclaimer, the term of this patent is extended or adjusted under 35 U.S.C. 154(b) by 821 days.

(21) Appl. No.: 12/118,960

(22) Filed: May 12, 2008

(65) Prior Publication Data

US 2009/0015457 A1 Jan. 15, 2009

Related U.S. Application Data

(60) Provisional application No. 60/917,414, filed on May 11, 2007.

(51) Int. Cl.
*G01S 17/02* (2006.01)

(52) U.S. Cl. .................................................... 250/504 R

(58) Field of Classification Search .............. 250/504 R, 250/493.1, 493.5, 336.1, 341.1; 340/815.4; 342/5, 22, 197
See application file for complete search history.

(56) References Cited

U.S. PATENT DOCUMENTS

| | | | | |
|---|---|---|---|---|
| 4,106,345 | A * | 8/1978 | Saunders et al. | 73/865.6 |
| 5,227,800 | A * | 7/1993 | Huguenin et al. | 342/179 |
| 5,567,950 | A * | 10/1996 | Meeker et al. | 250/504 R |
| 6,353,224 | B1 * | 3/2002 | Sinclair et al. | 250/336.1 |
| 6,635,892 | B2 * | 10/2003 | Kelly et al. | 250/493.1 |
| 6,958,868 | B1 * | 10/2005 | Pender | 359/742 |
| 7,358,890 | B2 * | 4/2008 | Price et al. | 342/82 |
| 7,642,949 | B2 * | 1/2010 | Pergande et al. | 342/27 |
| 7,839,349 | B1 * | 11/2010 | West | 343/781 CA |
| 7,858,938 | B2 * | 12/2010 | Daly et al. | 250/336.1 |
| 7,875,853 | B2 * | 1/2011 | Edwards | 250/338.1 |
| 7,952,079 | B2 * | 5/2011 | Neustadter et al. | 250/393 |
| 2005/0093713 | A1 * | 5/2005 | Orme | 340/815.4 |
| 2005/0168376 | A1 * | 8/2005 | Coward et al. | 342/22 |
| 2008/0000232 | A1 * | 1/2008 | Rogers et al. | 60/641.15 |
| 2008/0100504 | A1 * | 5/2008 | Martin et al. | 342/179 |

OTHER PUBLICATIONS

Sinclair, G.N.; Anderton, R.N.; Appleby, R.; , "Outdoor passive millimetre wave security screening," Security Technology, 2001 IEEE 35th International Carnahan Conference on , vol., No., pp. 172-179, Oct. 2001.* Guang-feng Zhang; Hong Wang; Guo-wei Lou; Xing-guo Li; , "Passive millimeter wave radiometric measurement of metal solid objects," Antennas, Propagation and EM Theory, 2008. ISAPE 2008. 8th International Symposium on , vol., No., pp. 679-681, Nov. 2-5, 2008.*

Yujiri, L.; , "Passive Millimeter Wave Imaging," Microwave Symposium Digest, 2006. IEEE MTT-S International , vol., No., pp. 98- 101, Jun. 11-16, 2006.*

* cited by examiner

*Primary Examiner* — John Sotomayor
(74) *Attorney, Agent, or Firm* — Matthew G. McKinney

(57) ABSTRACT

A passive outdoor millimeter wave illuminator for use with a concealed object detection system is disclosed. In a particular embodiment, the illuminator includes a panel having a plurality of horizontal louvers each having reflective properties for reflecting millimeter wave energy from the sky to a target and a pair of rear support arms for biasing the panel upwards. The illuminator further includes a base wherein a lower portion of the panel is rotatably mounted to a front edge of the base and the rear edge of the base is fixed to a lower end of the rear support so that the panel is capable of rotatable motion in a horizontal plane relative to the base. In addition, a slidable bushing engaged with a portion of the rear support arms is frictionally operable as to maintain the panel at the desired angle.

19 Claims, 4 Drawing Sheets

PASSIVE OUTDOOR MILLIMETER WAVE ILLUMINATOR

I. CROSS REFERENCE TO RELATED APPLICATIONS

This application claims the benefit of U.S. Provisional Application No. 60/917,414 filed May 11, 2007. The disclosure of the provisional application is incorporated herein by reference.

II. FIELD

The present invention relates in general to the field of concealed object detection, and in particular to a passive outdoor millimeter wave illuminator for use in connection with millimeter wave cameras.

III. DESCRIPTION OF RELATED ART

Security systems can be found at airports, train stations, arenas, construction sites, and other public, private, commercial and industrial facilities. In addition, security systems are used in uncontrolled outdoor environments such as border control or field military operations. A passive millimeter wave camera is one type of concealed object detection system. The passive millimeter wave camera detects radiation that is given off by all objects. The technology works by contrasting the millimeter wave signature of the human body, which is warm and reflective, against that of a cold gun, knife or other contraband. Those objects appear in contrast because of the differences in temperature, hence, millimeter wave energy, between the human body and the inanimate objects.

The harsh and uncontrolled outdoor environments require that the prior art millimeter wave cameras must be adapted for each installation to provide the proper contrast between the scene and a subject so that the camera can detect concealed objects, which is expensive and time consuming. Hence, a need exists in the art for a system for passive outdoor millimeter wave illuminator that requires no artificial energy source (e.g., electricity) to enhance the contrast between an individual and the scene to increase the efficacy of the concealed object detection system. Another need exists in the art for a passive millimeter wave illumination system that does not radiate any radiation or energy itself but uses naturally occurring millimeter wave energy from the sky.

Another need exists in the art for a passive millimeter wave illumination system that is readily adjustable for each particular application.

Another need exists in the art for a passive millimeter wave illumination system that is portable and having the ability to function away independently of standard utility services.

Another need exists in the art for a passive millimeter wave illumination system that is constructed in a variety of sizes, weights, and shapes dependent on the particular application.

Another need exists in the art for a passive millimeter wave illumination system that is constructed from a variety of materials.

However, in view of the prior art at the time the present invention was made, it was not obvious to those of ordinary skill in the pertinent art how the identified needs could be fulfilled.

IV. SUMMARY

In a particular embodiment, a passive outdoor millimeter wave illuminator for use with a concealed object detection system is disclosed. The illuminator includes a panel having a plurality of horizontal louvers each having reflective properties for reflecting millimeter wave energy from the sky to a target and a pair of rear support arms for biasing the panel upwards. The illuminator further includes a base wherein a lower portion of the panel is rotatably mounted to a front edge of the base and the rear edge of the base is fixed to a lower end of the rear support arms so that the panel is capable of rotatable motion in a horizontal plane relative to the base. In addition, a slidable bushing engaged with a portion of the rear support arms is frictionally operable as to maintain the panel at the desired angle.

One particular advantage provided by embodiments of the passive outdoor millimeter wave illuminator is that a stable, consistent reference level of millimeter wave energy is provided. The passive outdoor millimeter wave illuminator is extremely portable and requires relatively little setup time. In addition, the passive outdoor millimeter wave illuminator has essentially zero operating costs and substantially zero consumables. For example, the passive outdoor millimeter wave illuminator does not require electricity or any utility connections.

Another particular advantage provided by embodiments of the passive outdoor millimeter wave illuminator is the high reliability due to no moving parts in operation and is also environmentally friendly. The illuminator requires very little maintenance once installed correctly. Further, the passive outdoor millimeter wave illuminator does not generate heat or noise and is adaptable to be configured to serve larger sized areas by deploying multiple illuminators.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

A passive outdoor millimeter wave illuminator for use with millimeter wave cameras is disclosed. The disclosed system provides a millimeter wave illuminator for outdoor environments that in various embodiments requires no external power, is portable and completely passive. The system is appropriate for use with millimeter wave imaging systems where a known source of millimeter wave energy is required.

Figure 1:
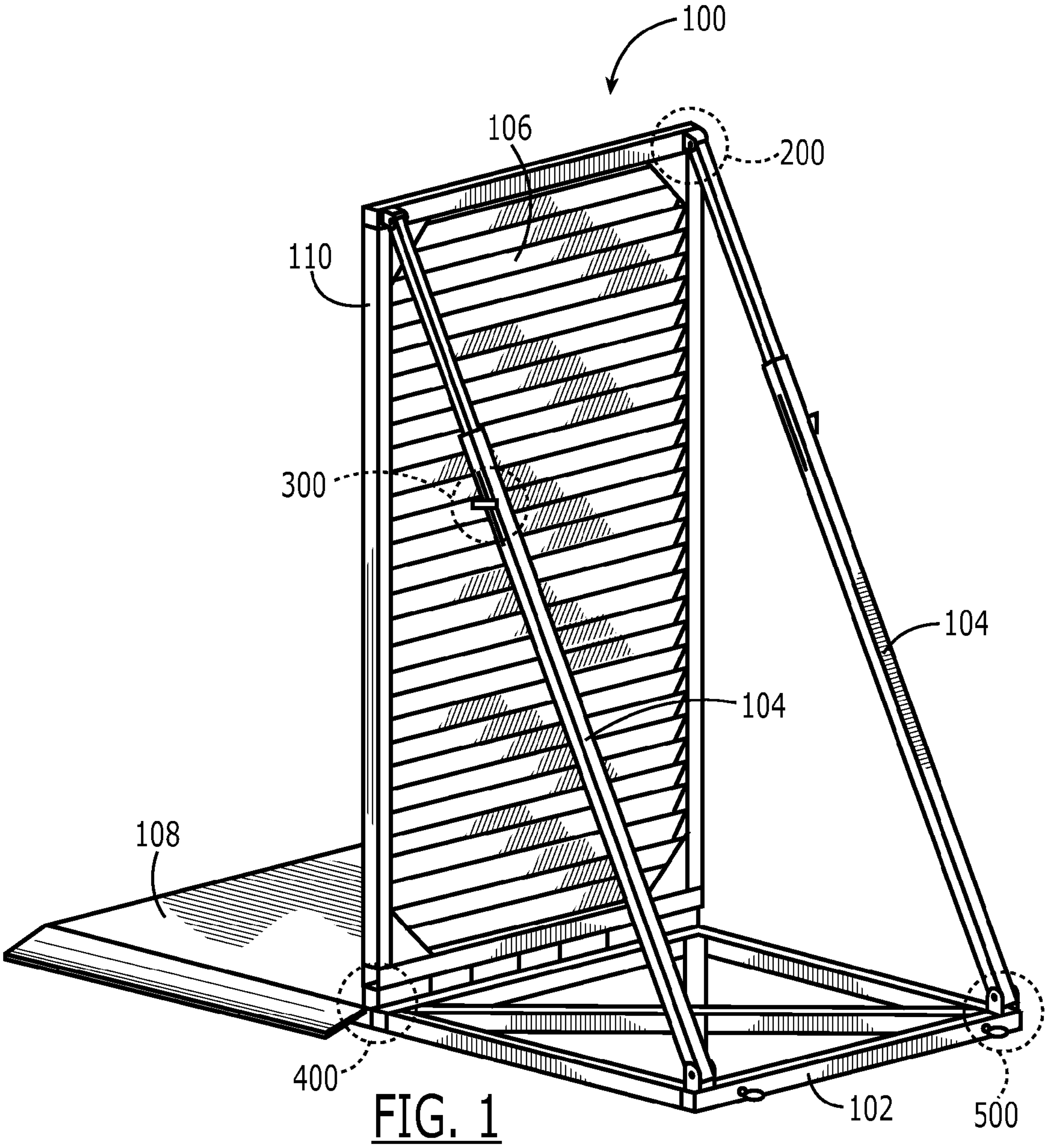
FIG. 1 is a perspective rear view of a particular illustrative embodiment of a passive outdoor millimeter wave illuminator.

Referring to FIG. 1, a particular illustrative embodiment of a passive outdoor millimeter wave illuminator is disclosed. The illuminator is generally designated 100. The disclosed illuminator 100 is comprised of components, techniques, designs and construction that separately or together provide an advantageous, predictable, portable, controlled and managed environment within which the concealed object detection system operates optimally.

A base 102 is rotatably mounted to a lower edge of a reflective panel 110 along a front edge using a hinge pin 400. Accordingly, the panel 110 is able to move about its lower edge to a desired angle relative to the base 102. The panel 110 is generally orientated vertically and the base 102 is orientated horizontally. In addition, the panel 110 can be constructed of varying materials in varying dimensions, weights, sizes and shapes. A pair of arms 104 supports the panel 110 at the desired angle. An upper connection 200 secures the arms 104 to a top edge of the panel 110 and the arms 104 extend from the top edge of the panel 110 to a rear edge of the base 102. A lower connection 500 secures the opposing end of the arms 104 to the rear edge of the base 102. A platform 108 is disposed in front of the panel 110 and adapted for an individual to stand on when being scanned by a millimeter wave camera.

The panel 110 further includes a plurality of horizontal louvers 106. It is desirable for the horizontal louvers 106 of the panel 110 to be constructed of a millimeter wave reflecting material, such as most metals. The louvers may be either at a fixed angle or adjustable to further increase the ability to precisely reflect the millimeter wave energy from a cold energy source (e.g., the sky) to a target. The entire panel 110 is designed and constructed to have a freedom of tilt for obtaining the optimum deployment angle depending on the installation site when the louvers 106 have a fixed angle.

In either a fixed angle or adjustable configuration, the horizontal louvers 106 are angled at an optimal angle to reflect the sky and direct the energy therefrom into a horizontally scanning imager or other sensing device as per the particular application. The passive outdoor millimeter wave illuminator exploits the nature of the open sky to provide a stable reference level of millimeter wave energy. For typical applications, the optimal angle is approximately 18 degrees, however this will change depending on the requirements of the environment and application. The louvers 106 can be made to be adjustable in length, width or angle similar to a Venetian blind.

Figure 2:
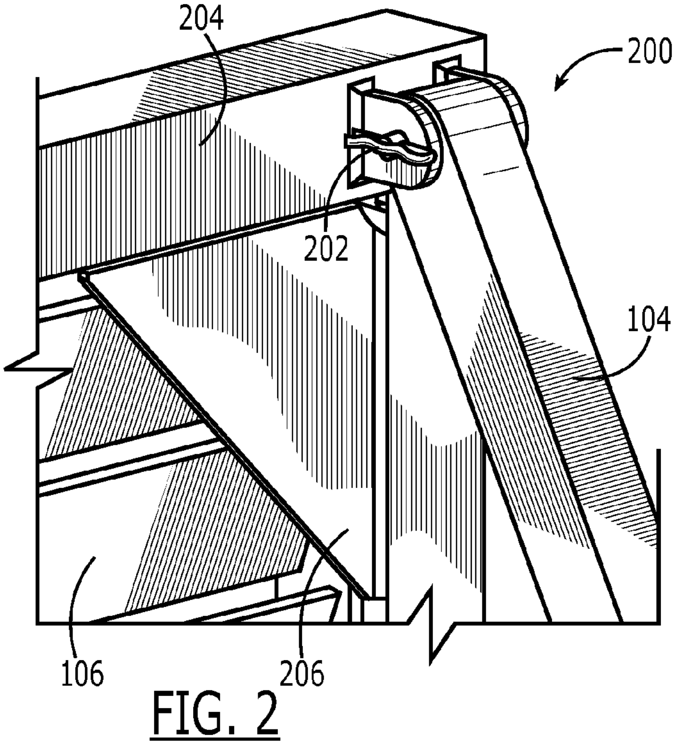
FIG. 2 is a perspective view of an upper connection between the panel and rear supports of a particular illustrative embodiment of a passive outdoor millimeter wave illuminator shown in FIG. 1.

Referring now to FIG. 2, the upper connection 200 between a first end of the arm and the top edge 204 of the panel 100 includes a receiver for receiving one end of the arm 104. A rod slides through the receiver and arm 104 forming the upper connection and the rod is secured in place using a cotter pin 202. Each arm 104 of the pair of arms has a similar connection. A plate 206 is disposed in an upper corner of the panel 110 and provides additional structural support to the panel 110.

Figure 3:
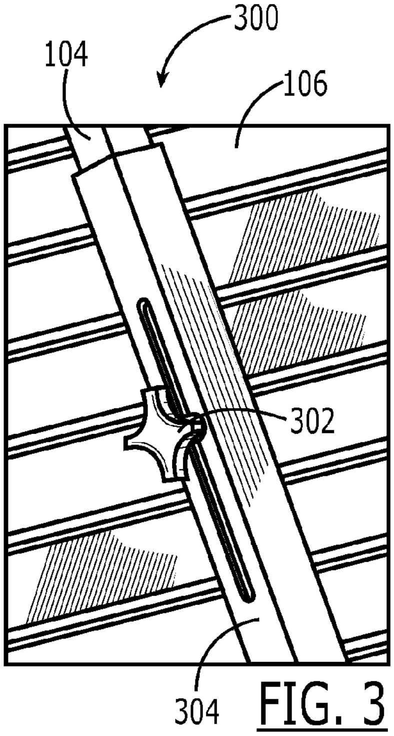
FIG. 3 is a perspective view of an angle adjustment device for the panel of a particular illustrative embodiment of a passive outdoor millimeter wave illuminator shown in FIG. 1.

The pair of arms 104 further includes angle adjustment means 300 that includes a slideable bushing that is frictionally operable to maintain each arm 104 at a desired length, as illustrated in FIG. 3. For example, as the arms 104 are adjusted to a shorter length, the angle between the panel 110 and the platform 108 is decreased. Alternatively, as the arms 104 are adjusted to a longer length, the angle between the panel 110 and the platform 108 is increased. The slideable bushing is operated by turning a handle 302 that reduces the friction fit of the arms 104 and allows the bushing to slide within slot 304 and adjust the length of the telescoping arms 104. The handle 302 is turned in the opposite direction to secure the arms 104 at the desired length.

Figure 4:
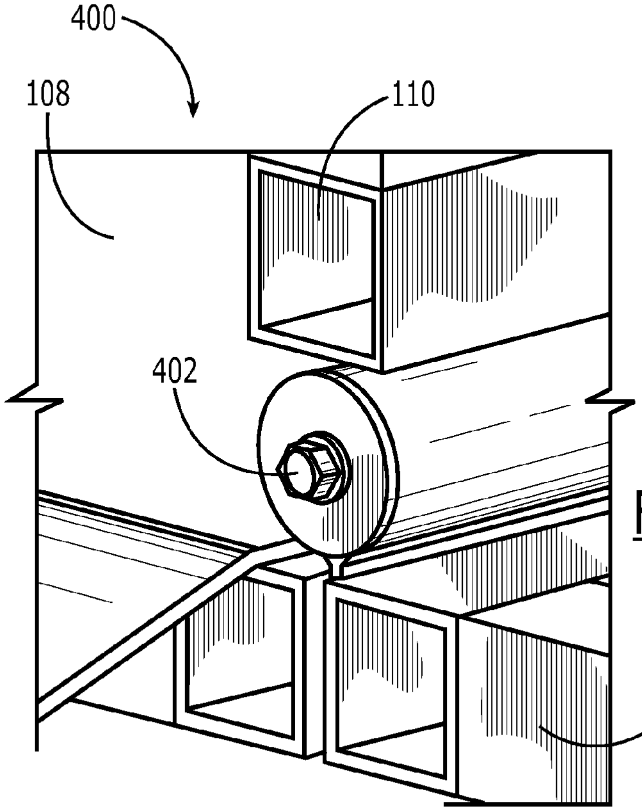
FIG. 4 is a perspective view of a lower connection between the panel and base supports of a particular illustrative embodiment of a passive outdoor millimeter wave illuminator shown in FIG. 1.

Referring now to FIG. 4, the hinge pin 402 configuration used to provide the ability for the panel 110 to rotate is illustrated. The hinge pin 402 is mounted to the lower edge of the panel 110 and to the base 102. The panel 110 rotates about the hinge pin 402 as the angle of the panel 110 is adjusted. The panel 110 is secured at the desired angle using the bushing as described above.

Figure 5:
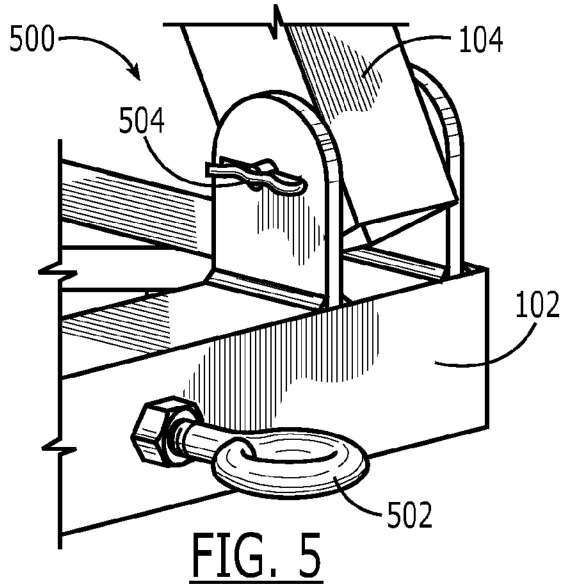
FIG. 5 is a perspective view of a lower connection between the base supports and the rear supports of a particular illustrative embodiment of a passive outdoor millimeter wave illuminator shown in FIG. 1.

Similar to the upper connection 200 between a first end of the arm and the top edge 204 of the panel 110 illustrated in FIG. 2, the lower connection 500 includes a receiver for receiving the opposing end of the arm 104 as illustrated in FIG. 5. A rod slides through the receiver and arm 104 forming the lower connection and the rod is secured in place using a cotter pin 504. Each arm 104 of the pair of arms has a similar connection.

Figure 6:
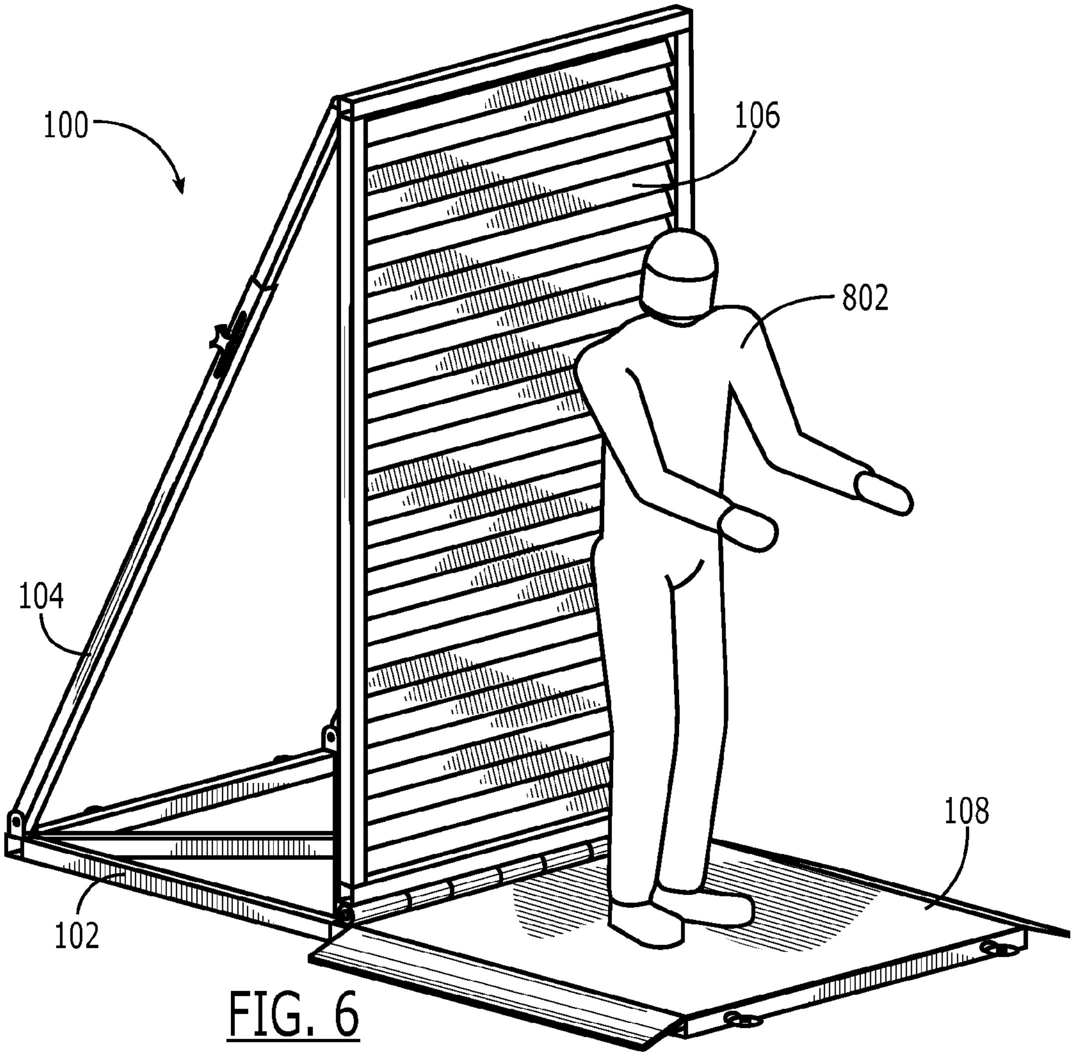
FIG. 6 is a perspective front view of a particular illustrative embodiment of a passive outdoor millimeter wave illuminator.
Figure 7:
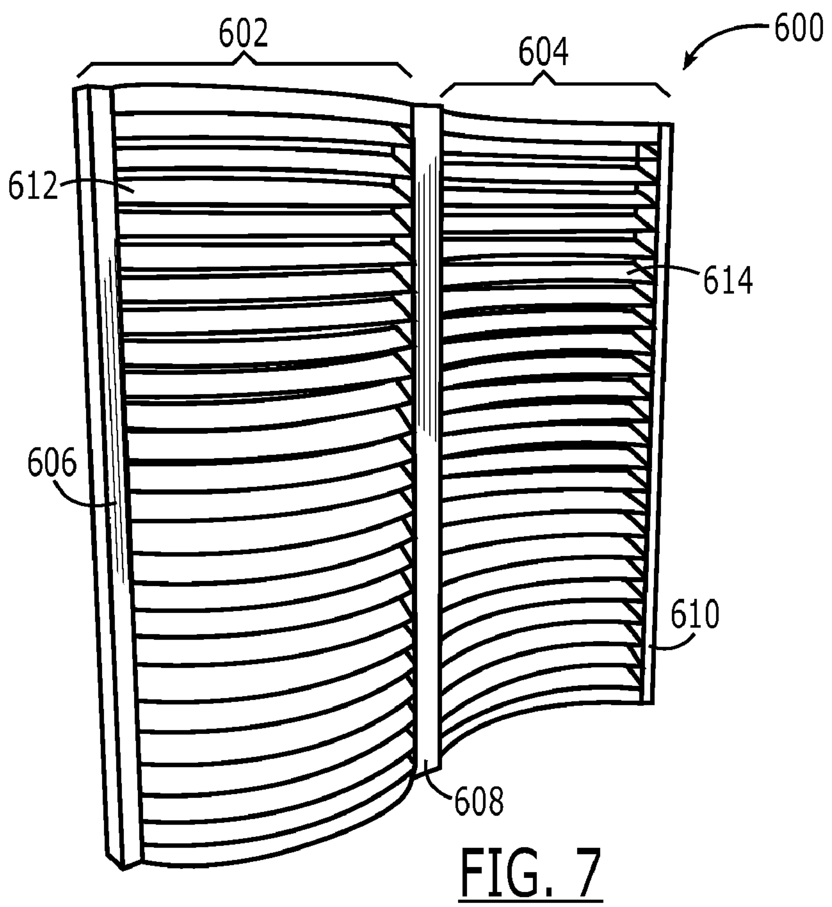
FIG. 7 is a perspective front view of a particular illustrative second embodiment of a passive outdoor millimeter wave illuminator.
Figure 8:
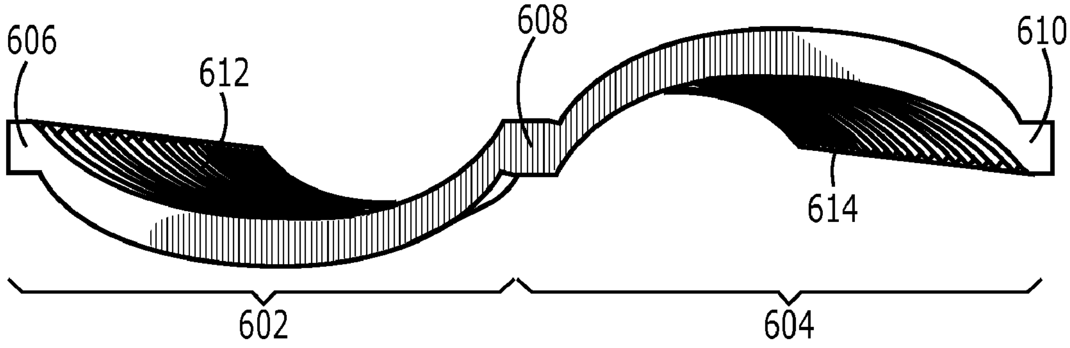
FIG. 8 is a top view of a particular illustrative second embodiment of a passive outdoor millimeter wave illuminator shown in FIG. 7.

Referring now to FIG. 6, to utilize the passive outdoor millimeter wave illuminator, the operator deploys the panel(s) 110 as a background, backdrop or reflecting surface anywhere the stable millimeter wave energy source is required. Since the illuminator exploits the open sky as a millimeter wave source and is otherwise passive, it operates best when there exists an unobstructed access to the outdoor sky. When combined with a millimeter wave concealed weapon/object detection system (not shown), the illuminator 100 operates as a stable background reference while the subject 802 of the millimeter wave imaging stands or walks in front of the illuminator 100.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A passive outdoor millimeter wave illuminator, the illuminator comprising:

a panel having reflective properties for reflecting millimeter wave energy from a cold energy source;

a rear support for biasing the panel upwards;

a base having a front edge and a rear edge; wherein a lower portion of the panel is rotatably mounted to the front edge of the base and the rear edge of the base fixed to a lower end of the rear support so that the panel is capable of rotatable motion in a horizontal plane relative to the base; and an angle adjustment means engaged with a portion of the rear support so as to maintain the panel at the desired angle.

2. The illuminator of claim 1, wherein the cold energy source is the sky.

3. The illuminator of claim 1, wherein the panel further comprising a plurality of adjustable horizontal louvers.

4. The illuminator of claim 1, wherein the rear support comprising a pair of arms each having the angle adjustment means.

5. The illuminator of claim 4, wherein the angle adjustment means comprising a slidable bushing frictionally operable to maintain each arm at a desired length, which controls the angle of the panel.

6. The illuminator of claim 1, wherein the rear support is removably connected to the rear edge of the base using at least one pin.

7. The illuminator of claim 1, wherein the panel rotatably mounted to the front edge of the base using a hinge pin.

8. The illuminator of claim 1, wherein the base further comprising at least one tie down to secure the illuminator in position.

9. The illuminator of claim 1, further comprising a platform disposed in front of the panel and adapted for an individual to stand on when imaging the individual with a millimeter wave camera.

10. The illuminator of claim 3, wherein the louvers having a fixed angle.

11. The illuminator of claim 3, wherein the louvers having an adjustable angle.

12. A passive outdoor millimeter wave illuminator, the illuminator comprising:

a first panel having a concave shape about a longitudinal axis;

a second panel having a convex shape about a longitudinal axis and relative to the first panel; and the first panel and second panel comprising a plurality of adjustable horizontal louvers;

wherein the first panel and the second panel having reflective properties for reflecting millimeter wave energy from a cold energy source.

13. The illuminator of claim 12, wherein the cold energy source is the sky.

14. The illuminator of claim 12, wherein the first panel and second panel orientated to reflect millimeter wave energy on opposing sides.

15. The illuminator of claim 14, wherein the first panel and the second panel adjoined along a longitudinal edge to provide structural support in an upright position.

16. The illuminator of claim 15, wherein the longitudinal edge further comprising a hinge pin to rotatably mount the first panel to the second panel.

17. The illuminator of claim 12, further comprising a leveling mount to adjust the angle of the first panel and second panel.

18. The system of claim 12, wherein the horizontal louvers having blast mitigation properties.

19. A passive outdoor millimeter wave illuminator, the illuminator comprising:

a panel having a plurality of horizontal louvers each having reflective properties for reflecting millimeter wave energy from the sky to a target;

a pair of rear support arms for biasing the panel upwards;

a base having a front edge and a rear edge; wherein a lower portion of the panel is rotatably mounted to the front edge of the base and the rear edge of the base fixed to a lower end of the rear support so that the panel is capable of rotatable motion in a horizontal plane relative to the base; and a slidable bushing engaged with a portion of the rear support arms and frictionally operable as to maintain the panel at the desired angle.

* * * * *